W. V. TURNER.
BRAKE AND SAFETY CAR CONTROL.
APPLICATION FILED MAR. 23, 1916.
1,224,238.
Patented May 1, 1917.
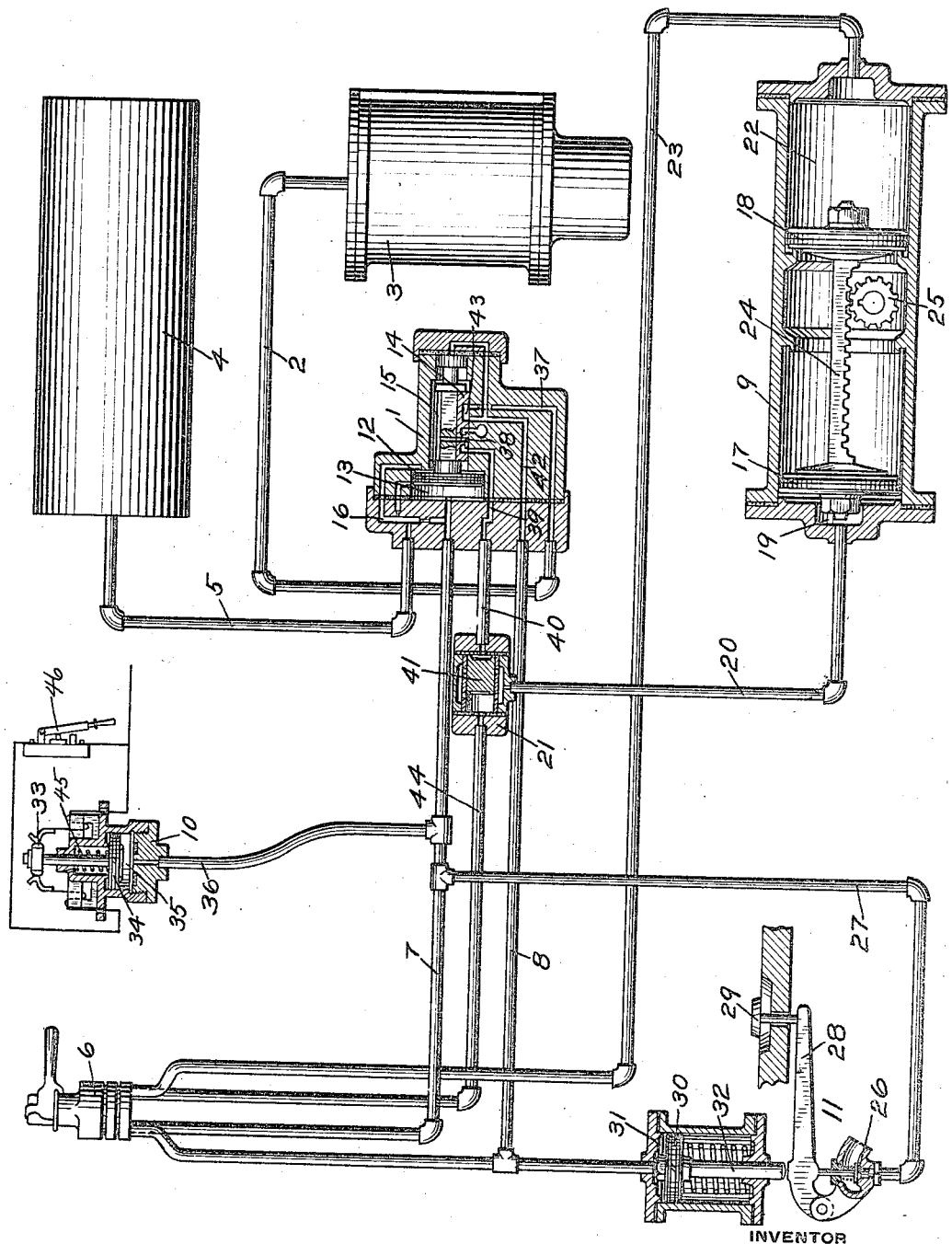
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE AND SAFETY CAR CONTROL.

1,224,238.        Specification of Letters Patent.        Patented May 1, 1917.

Application filed March 23, 1916. Serial No. 86,126.

*To all whom it may concern:*

Be it known that I, WALTER V. TURNER, a citizen of the United States, residing at Wilkinsburg, in the county of Allegheny and State of Pennsylvania, have invented new and useful Improvements in Brake and Safety Car Controls, of which the following is a specification.

This invention relates to a brake and safety car control equipment adapted more particularly for traction service.

One object of the invention is to provide improved means for automatically causing an application of the brakes when the operator leaves the car or becomes incapacitated from any cause, the apparatus being also designed to open the power circuit and the car doors in such event.

Another object of the invention is to provide a device for automatically causing an application of the brakes when the operator becomes incapacitated, and having means for preventing operation of the automatic device, in case the brakes are applied with straight air.

Other objects and advantages will appear in the following more detailed description of the invention.

In the accompanying drawing; the single figure is a diagrammatic view of a car brake and safety control equipment embodying my invention.

As shown in the drawing, the car brake and safety control equipment may comprise a straight air emergency valve device 1, connected by pipe 2 to a brake cylinder 3, a main reservoir 4 connected by pipe 5 to valve device 1, a brake valve device 6 connected to an emergency brake pipe 7 and a straight air pipe 8, a door and step controlling cylinder 9, a power circuit controller 10, and a dead man's controlling device 11.

The emergency valve device 1 may comprise a piston 12 contained in piston chamber 13 connected to emergency brake pipe 7 and a valve 14 contained in valve chamber 15 which is connected to the main reservoir 4 through a passage 16.

The door and step controlling device 9 may comprise connected piston heads 17 and 18, the chamber 19 at the outer face of piston head 17 being connected to a pipe 20 leading to a double check valve device 21 and chamber 22 at the outer face being connected by pipe 23 to the brake valve device 6.

The bar 24 which connects the piston heads 17 and 18 is provided with rack teeth adapted to engage the teeth of a pinion 25 which is operatively connected to the mechanism (not shown) for controlling the operation of the car doors and steps.

The dead man's control device may comprise a valve 26 for venting fluid through a pipe 27 from the emergency brake pipe 7 and this valve is normally held to its seat by a lever 28 adapted to be engaged by a treadle pin 29, as long as the pin is pressed down by the foot of the operator.

Associated with the lever 28 is a piston 30 contained in piston chamber 31 connected to straight air pipe 8 and said piston carries a stem 32 adapted to engage the lever 28.

The power circuit controlling device 10 may comprise a switch 33 for controlling the power circuit and a piston 34 contained in piston chamber 35, for operating said switch, the piston chamber 35 being connected by pipe 36 to emergency pipe 7.

In operation, the main reservoir 4 being charged with fluid under pressure in the usual manner, fluid is supplied through pipe 5 to the emergency brake pipe 7 and to opposite sides of the piston 12.

The operator normally maintains his foot on the treadle pin 29, but if he leaves the car or becomes incapacitated, then the valve 26 will be blown off its seat, so as to vent fluid from the emergency pipe 7 and from piston 12. Said piston is thereupon forced to application position, in which the valve 14 uncovers a passage 37, permitting fluid from the main reservoir, supplied to valve chamber 15, to flow to the brake cylinder 3.

Since the fluid under pressure in pipe 7 is vented to the atmosphere through valve 26, the fluid pressure on piston 34 is also relieved, thus permitting the spring 45 to throw switch 33 to open position and thereby open the power circuit of the car.

In emergency position of valve 14, a port 38 registers with passage 39 leading to pipe 40 which communicates with one face of the double check valve 41, so that fluid is supplied to the double check valve and forces the same over to a position in which fluid is supplied from pipe 40 to pipe 20 and thence to piston 17.

It may here be stated that in the normal running position of brake valve 6, ports are provided for supplying fluid from the emergency pipe through pipe 23 to the piston 18, while pipe 20 leading to piston head 17 is open to the atmosphere.

The fluid pressure acting on piston head 18 therefore normally maintains the piston device in the position shown in the drawing, so that the car door and steps are held closed while the car is running.

When, however, the operator removes his foot from treadle pin 29 and fluid is vented from emergency pipe 7, it will be seen that since said emergency pipe is the source of fluid supply for the brake valve, fluid will also flow from piston chamber 22 through pipe 23 to brake valve 6 and thence to pipe 7, so that said chamber is vented to the atmosphere with pipe 7, thus permitting fluid supplied to piston head 17 to operate the piston device and automatically open the car doors and steps.

Normally, the brakes are controlled by straight air, and by manipulation of the brake valve 6, fluid may be supplied from the emergency brake pipe 7 to the straight air pipe 8 and thence through passage 42 and cavity 43 in slide valve 14 to the brake cylinder, to effect a straight air application of the brakes.

One feature of my invention provides for preventing the automatic operation of the apparatus when a straight air application of the brakes is made and this is preferably accomplished by the operation of piston 30 which, it will be noted, is subjected to the pressure of fluid supplied to the brake cylinder in a straight air application of the brakes. Said piston is forced outwardly by straight air pressure so as to cause the stem 32 to press the lever 28 and thereby prevent the lifting of valve 26 from its seat.

The car doors and steps may also be controlled at will by manipulation of the brake valve 6, the same being provided with ports for supplying fluid through pipe 44 to one face of the double check valve 41.

When it is desired to open the car doors and operate the steps, fluid is supplied to pipe 44 and the double check valve 41 is shifted so as to establish communication from pipe 44 to pipe 20 and thereby cause the movement of piston head 17 to the right, as in the case of automatic operation, the chamber 22 being connected through pipe 23 and ports in the brake valve to the atmosphere.

When it is desired to close the doors, the brake valve is turned to a position in which fluid is vented through pipe 44 from piston chamber 19 while fluid is supplied through pipe 23 to piston chamber 22, so that the piston 18 is shifted to the left, causing the closing of the car doors and steps.

The power switch controlling piston 34 operates when under fluid pressure to hold the switch 33 closed, so that whenever there is no pressure in the emergency pipe 7, the switch will automatically be opened. In some cases, it may be necessary or desirable to have the power switch closed, even when there is no fluid pressure in the system, for instance, it may be desired to shift the car about at a terminal, without waiting for the charging of the main reservoir. In order to provide for temporary operation when there is no fluid pressure, a hand operated switch 46 may be provided for controlling a circuit around the automatic switch 33.

The switch 46 is normally held open by a spring and it is necessary for the operator to maintain his hand on the switch in order to keep the circuit closed.

Thus in case of necessity, the operator, by holding the switch 46 closed with his hand, may provide power for moving the car.

Having now described my invention, what I claim as new and desire to secure by Letters Patent, is:

1. In a safety car control apparatus, the combination with a device for effecting an emergency application of the brakes when the operator becomes incapacitated, and means for controlling the brakes in service, of means operating upon a service application of the brakes for preventing the operation of said emergency device.

2. The combination with a device for effecting an emergency application of the brakes upon release by the operator and means for effecting a service application of the brakes, of means operating upon a service application of the brakes for preventing the release of said emergency device.

3. In a fluid pressure brake, the combination with an emergency brake pipe, an emergency valve device operated upon a reduction in brake pipe pressure for effecting an application of the brakes, and a valve normally held closed by the operator and adapted upon release to vent fluid from the brake pipe, of a straight air brake pipe and means operated upon supplying fluid to the straight air pipe for holding said valve closed.

4. In a fluid pressure brake, the combination with an emergency brake pipe, an emergency valve device operated upon a reduction in brake pipe pressure for effecting an application of the brakes, and a valve normally held closed by the operator and adapted upon release to vent fluid from the brake pipe, of a straight air brake pipe and a piston device operated by fluid supplied to the straight air pipe for holding said valve closed and thereby preventing an emergency application of the brakes when the operator releases said valve.

5. In a safety car control apparatus, the combination with an emergency brake pipe and a valve device operated upon a reduction in brake pipe pressure for effecting an application of the brakes, of a fluid operated piston device for controlling a car door and means operating upon a reduction in brake pipe pressure for venting fluid from one side and for supplying fluid to the opposite side of said piston device to thereby effect the opening of the car door.

6. In a safety car control apparatus, the combination with an emergency brake pipe and means operated upon a reduction in brake pipe pressure for effecting an application of the brakes, of a double headed piston adapted to close a car door upon supplying fluid to one piston head and releasing fluid from the other head and means operating upon a reduction in brake pipe pressure for releasing fluid from the first mentioned head and for supplying fluid to the other head to thereby effect the opening of said door.

7. The combination with a brake pipe, a reduction in pressure in which is adapted to effect an application of the brakes, of a piston device for controlling a car door and a manually operated valve normally supplying fluid from said brake pipe to said piston device for holding the door closed and means operated upon a reduction in brake pipe pressure for supplying fluid to the opposite side of said piston device to effect the opening of the car door.

8. In a safety car control apparatus, the combination with an emergency brake pipe, of a piston device for controlling a car door, a manually operated valve normally connecting the emergency pipe with one side of said piston device, and an emergency valve device operated upon a reduction in pressure in the emergency pipe for supplying fluid to the opposite side of said piston device.

9. In a safety car control apparatus, the combination with an emergency brake pipe normally charged with fluid under pressure, of a manually operated valve, a double headed piston device having one piston head normally connected to the emergency brake pipe through the manually operated valve and the other head to the atmosphere for controlling a car door, and an emergency valve device operated upon a reduction in brake pipe pressure for supplying fluid to the last mentioned piston head.

10. The combination with an emergency brake pipe and an emergency valve device operated upon a reduction in brake pipe pressure for effecting an application of the brakes, of a piston device for controlling a car door, a brake valve for supplying fluid from the emergency brake pipe to one side of said piston device and adapted to normally connect the opposite side with the atmosphere for holding the car door closed, and a double check valve operated by fluid supplied upon operation of the emergency valve device for cutting off the atmospheric vent to one side of said piston device and for opening communication for supplying fluid thereto, to thereby operate said piston device to effect the opening of the car door.

In testimony whereof I have hereunto set my hand.

WALTER V. TURNER.